United States Patent [19]

Chao

[11] 3,995,118
[45] Nov. 30, 1976

[54] CALL PROCESSING RESTORATION ARRANGEMENT FOR A TELEPHONE SWITCHING SYSTEM

[75] Inventor: Chin Chao, Boulder, Colo.

[73] Assignee: Bell Telephone Laboratories, Incorporated, Murray Hill, N.J.

[22] Filed: July 3, 1975

[21] Appl. No.: 593,180

[52] U.S. Cl. .......................... 179/15 BF; 179/18 ES
[51] Int. Cl.$^2$ ........................................... H04J 3/02
[58] Field of Search ..... 179/18 ES, 15 BF, 175.2 C, 179/175.2 R

[56] References Cited
UNITED STATES PATENTS

| | | | |
|---|---|---|---|
| 3,042,752 | 7/1962 | Fulmer.......................... | 179/15 BF X |
| 3,908,092 | 9/1975 | Hight et al. ...................... | 179/18 ES |
| 3,920,977 | 11/1975 | Karsas........................... | 235/153 AE |

*Primary Examiner*—Thomas W. Brown
*Attorney, Agent, or Firm*—Howard R. Popper

[57] ABSTRACT

A stored program controlled time division telephone switching system is disclosed in which apparatus is provided for permitting the main processor to cope with the after-effects of a main memory unit failure. Upon detecting that the memory unit has been restored to operation (but not necessarily its information content) the processor executes a sequence of operations to interrogate the time division network to ascertain the identity of stable calls in progress. A scratch pad memory is employed to accrue a count of which time slots have at least two ports assigned thereto. These are stable calls. Thereafter the main memory is accessed using the port numbers from the scratch pad to write idle progress marks in the main memory progress mark registers for calls having less than two ports assigned and special progress marks for other existing calls. The processor may then perform minimal processing for these existing calls in order to avoid real-time overload during recovery when the processor must also handle new calls and perform maintenance processing as well.

12 Claims, 1 Drawing Figure

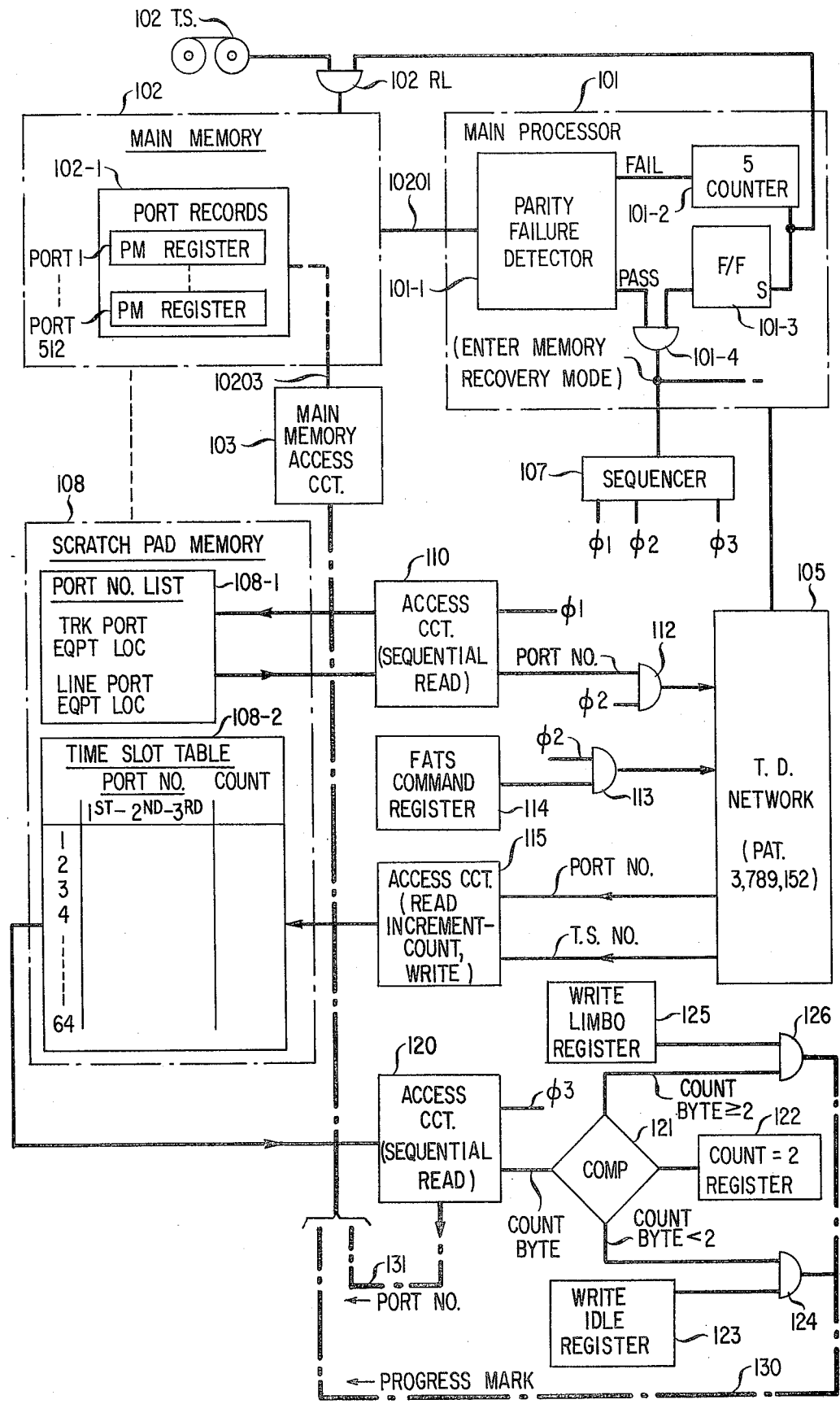

CALL PROCESSING RESTORATION ARRANGEMENT FOR A TELEPHONE SWITCHING SYSTEM

BACKGROUND OF THE INVENTION

This invention relates to telephone switching systems and more particularly to program controlled time division switching systems which operate on customer's premises or under other conditions where high reliability and self-maintenance are important.

In the years since the issuance of the Gebhardt et al U.S. Pat. No. 3,225,144, issued Dec. 21, 1965, a great revolution has taken place in the technology of telephone switching. The Gebhardt patent disclosed an early attempt at extending to the private branch exchange market the capability of time division switching technology. The commercial version of the system described in the Gebhardt patent is widely known as the ESS No. 101 and was manufactured by the Western Electric Company. The control of the establishment of telephone connections in the time division network of that system was effected by means of a stored program control unit which was most advantageously located in a central office. The network switches themselves were located in cabinets at the customers' premises and three or more switch units at diverse locations constituted the network of that system. The main controller at the central office had at its disposal a main memory unit which was divided, in accordance with the technology of the time, into changeable and semi-permanent memories. The changeable memory, termed a "call store", employed ferrite sheet storage and the semi-permanent memory, termed a program store, employed twistor technology. Both memory units were extremely reliable but, by present day standards, were somewhat bulky and characterized by slow access times.

As the main controller executed the call processing program stored in the program store, access was had to the call store and, in particular, to certain registers thereof which stored changeable progress mark words. The bits of a progress mark word either directly spelled out the address of, or were a pointer to the address of, the next-to-be-executed sequence of call processing programs that would be appropriate to the next phase or state of the particular type of call then being handled. Thus the progress mark could be interpreted either to identify how far a given call had "progressed" in its establishment and also, in a second sense, to furnish the addresses in the program store memory of the instructions necessary to further process the call.

More recently, time division switching systems have been built to serve customers whose installations require fewer telephones than the minimum size that could economically be handled by the rather large No. 101 ESS machine. A moderate size time division PBX switching system is disclosed for example, in D. G. Medill-J. F. O'Neill U.S. Pat. No. 3,789,152 issued Jan. 29, 1974. In that system, certain economies were achieved by employing a wired-logic rather than a stored-program controlled switching system. Both the main controller and the network were compact enough to reside on the customer's premises. In addition, each port appearing in the time division network had its own time slot storing shift register so that the network had an independent record of existing connections. The main controller of the Medill-O'Neill system from time to time issued a command to the network to identify the time slot number actually assigned to a given port in the network and this information was used by the central control to audit network operation.

More recently still, a time division switching system has been built which incorporates certain of the features of both the aforementioned Gebhardt et al and Medill-O'Neill patents. That system, certain aspects of which are the subject matter of the copending application of J. F. O'Neill Ser. No. 521,650 filed Nov. 7, 1974, now Pat. 3,916,118 issued Oct. 28, 1975 employs a stored program controlled processor, a fast access, semiconductor memory in which the programs as well as the progress marks that define the status of calls being handled are stored, and a time division switching network in which the individual ports have time-slot-defining shift registers. The semiconductor memory is deployed among one or more printed circuit boards removably mounted in the card carrier of a relay rack cabinet. The physical size of this switching system is sufficiently small so as to be capable of being unobtrusively located on the customer's premises. The system, in one of its embodiments, is capable of serving 512 network ports which may be apportioned among lines, trunks and service circuits in any desired combination.

While the art of maintenance processing is well developed, as exemplified by the teachings in the aforementioned Gebhardt et al and Medill-O'Neill patents, the problem of assuring reliable operation of a program-controlled switching system that is located on a customer's premises is somewhat more specialized than the maintenance arrangements appropriate to large, program-controlled central office switching installations such as the well-known No. 1 ESS described in the September 1964 *Bell System Technical Journal*. In small systems sufficient main processor sophistication must be provided to handle normal call processing requirements, including the specialized service features desired by some customers. The processor must also have sufficient capability to perform routine maintenance testing and verification. Certain conditions that are of likely, but infrequent, occurrence may, however, befall the switching system. To provide for their complete analysis and remediation would unduly complicate the processor or its programs. Nevertheless the system must be allowed to operate, on some basis, after such a condition has occurred. For example, when service personnel remove a semiconductor memory board from the card carrier the information content of the board is destroyed. When the card is reinstalled the semiconductor memory elements will be in random states and will represent meaningless information. It is envisioned that this may well take place while the system is in actual operation processing telephone calls. A stored program-controlled telephone switching system, unlike a general-purpose digital computer, is a real-time system and some means must be found to maintain system operation under these circumstances. It is important, moreover, to realize that incident to system recovery the processor may be quite severely taxed since it must perform restoration functions as well as handle real-time calls. The problem of preventing a processor from running out of "real time" as its occupancy is increased in the face of traffic conditions is dealt with in Eckhart-Hoover U.S. Pat. 3,623,007 issued Nov. 23, 1971. In that system, the number of items of new work taken from certain classes of hoppers is reduced by a flexible percentage as system occupancy increases beyond a given threshold. While such a system is appropriate for large and sophisticated stored program controlled systems it may not be efficient to incorporate that technique in smaller stored program controlled systems.

SUMMARY OF THE INVENTION

I have devised an arrangement for controlling system operation following restoration of memory unit function after a memory failure or other disturbance to main processor memory.

A parity failure detector is provided in the main processor to detect memory failure and when a sufficient number of successive parity failures has been detected, a major memory failure flip-flop is set. A signal is generated also to attempt to reload the main memory from tape unit back-up. When the main memory has been successfully reloaded, the parity failure detector will detect the resumption of memory operation even though the information content may not be adequate for completely normal system operation. A sequencer is then put into operation to restrict main processor activity to rendering "bare bone" service for existing calls and thereby prevent system overload while performing needed recovery routines and attempting to serve new calls. The sequencer accesses a scratch pad memory containing a list of port equipment locations and the ports are then accessed in the network to ascertain whether the network has a validly assigned time slot therefor. Each time slot found to have an assigned port is recorded in a second portion of the scratch pad memory, and each time a given time slot is found to have another port using that time slot, a count byte in the scratch pad memory is augmented. After all of the ports in the network have been canvassed, the scratch pad memory is read out and any time slot that has accrued a count of less than two ports assigned thereto is identified. The port for this time slot then has an idle progress mark word recorded in its main memory unit progress mark register. The main processor may then, in its usual manner, address the network and erase the time slot therefrom to clear the network. The port identified to an active time slot communications path with another port will have a special "LIMBO" progress mark written in its progress mark register of main memory. The LIMBO progress mark will be recognized by the main processor as a signal to access programs controlling only limited call processing operations. For example, the processor may access a program which will merely take down the connection at the end of the call. Accordingly, other normally available processing routine such as switchhook transfer and conference calls will not be permitted for existing calls as their handling may absorb too much of the main processor real-time capacity. In this manner, the "saved" portion of main processor capacity may be employed for the performance of system restoration processing.

BRIEF DESCRIPTION OF THE DRAWING

The foregoing and other objects and features of my invention may become more apparent by referring now to the drawing, the single FIGURE of which shows relevant portions of a telephone switching system arranged in accordance with my invention.

Detailed Description

As has been indicated above, my invention may be most easily understood in the environment of an illustrative telephone switching system employing major elements of the type described in the above-mentioned Gebhardt et al. and Medill et al. patents. The illustrative switching system includes a stored progam controlled main processor 101 of the type shown in the above-mentioned Gebhardt et al. patent. Equally advantageously, a microprogram controlled type of processor as disclosed in the copending applications of J. C. Moran Ser. Nos. 533,454 and 533,339 both filed Dec. 16, 1974, may be used. In addition to the apparatus described in these patents, my processor includes the combination of elements 101-1 through 101-4 whose operation and purpose will hereinafter be described.

The main memory unit 102 of the illustrative system is assumed, for the purpose of simplifying the drawing, to embody both the semi-permanent program store and the temporary call store memories described in the Gebhardt et al. patent and the temporary memory portion thereof includes therein register words PORT 1 through PORT 512 for storing progress marks, described in the Gebhardt et al. patent, for identifying the status of a call, if any, involving each of the 512 ports of the system. Instead of using ferrite sheet and twistor technology, the main memory unit may employ the more modern and faster access semiconductor elements fabricated in chips and mounted on plug-in boards for easy replacement.

The ports, i.e., lines, trunks and service circuits appear in and are interconnectable with each other through time division network 105 which, advantageously, is of the type disclosed in Medill et al. U.S. Pat. No. 3,789,152.

Since the processing of telephone calls in a time division network such as network 105 under the control of a main processor such as 101 utilizing main memory 102 having both the programs and data necessary for processing those calls is well known and is described in the aforementioned patents, the call processing will not be repeated herein. Let it be assumed, however, that maintenance personnel have had occasion to repair one of the plug-in cards of main memory 102. Such repair can be carried out without disturbing any of the communications connections that exist in network 105 because, as described in U.S. pat. No. 3,785,152, each network port has associated therewith an individual time slot shift register (not shown herein but shown in FIG. 1 at reference number 102 of U.S. pat. No. 3,785,152). The port shift registers maintain existing time slot assignments irrespective of main memory 102 function. In other words, processor 101 is only called into operation to set up and to take down calls but is not required to maintain communications connections in network 105 once they have been established therein.

In accordance with my invention, main processor 101 is equipped with a parity failure detector 101-1 which will identify when information obtained from main memory 102 is incorrect, as it would be when a memory board is removed from the circuit or when the elements of a memory board fail in service. When the memory board is repaired and reinserted, the information in its semiconductor elements will be in a random state and there is no reason to suspect that the parity bit for each memory word will be correct. Accordingly, parity will still fail and this failure of parity will be detected by parity failure detector 101-1. Each time detector 101-1 detects parity failure in the information obtained from main memory 102 it energizes its FAIL lead output to counter 101-2. Counter 101-2 will be incremented until a predetermined number, say 5, failures have occurred in succession. At this time, counter 101-2 will set major memory failure flip-flop 101-3. The setting of flip-flop 101-3 activates the right-hand input of AND gate 101-4. But gate 101-4 is not yet enabled to provide an output to enable sequencer 107.

At the same time that counter 101-2 sets major memory failure flip-flop 101-3, it activates memory reload gate 102RL to reload memory unit 102 from tape unit system 102TS. If the memory board that had been pulled from main memory 102 was a program store memory board, correct programming information will be returned to the memory board from tape unit system 102TS. If the board was a temporary memory board, actual call status information will not be returned to the board from tape unit 102TS since transient call state data is not provided in the tape back-up. However, tape unit system 102TS will provide memory initialization information to memory boards of unit 102 and, accordingly, parity will once again be correct although the information is "initial state" only.

Following the memory failure and the reloading of memory from tape unit system 102TS, parity failure detector 101-1 will eventually detect that the information currently being supplied over cable 10201 has correct parity and will, accordingly, activate its PASS output lead. The activation of lead PASS when major memory failure flip-flop 101-3 has been set will completely enable the output of AND gate 101-4 thereby enabling sequencer 107 to commence sequential energization of its output leads $\phi1$, $\phi2$, and $\phi3$.

As system operation has progressed so far, a memory failure has been detected and the cause of that failure has been corrected. However, the overall system is still not in as good condition as it was prior to the failure. The records of calls that were in the process of being set up will, of course, have been lost and the volume of traffic that was not able to complete calls during the period of outage should be handled as expeditiously as possible once the memory card is reinstalled and memory unit 102 has been reloaded. However, it is more important to give customers reliable basic service than service with all of the optional features such as call transfer, add-on conference, etc., that are customarily available in stored program controlled electronic switching systems when operating normally. Accordingly, it would be desirable to curtail the rendering of premium services and condition the system to render only basic service. However, at this point, neither the main memory 102 nor main processor 101 can be depended upon to do this because neither has any information as to the identity of or location of calls presently existing in network 105. In accordance with my invention sequencer 107, when enabled, initiates a sequence of operations to ascertain the existence of communications connections in network 105 and for each connection found to be validly existing causes a special "LIMBO" progress mark to be written into the appropriate progress mark register of memory 102 to curtail service to the minimum "bare bones" required for reliable operation.

With the onset of phase $\phi1$ of sequencer 107, access circuit 110 addresses the head cell of the port number list 108-1 of scratch pad memory 108. The port number list stores in sequence the equipment locations of each trunk port and each line port in time division network 105. The first time that lead $\phi1$ is energized, access circuit 110 addresses the entry in the port number list containing the trunk port equipment location for the first trunk port in network 105. The equipment location information in that entry is returned to access circuit 110 and stored in flip-flops thereof (not shown). Lead $\phi2$ is next energized. However, the next time lead $\phi1$ is energized, access circuit 110 addresses the second entry in the port number list 108-1 of scratch pad memory 108 and obtains therefrom the equipment location information corresponding to the second port in network 105, and so on.

A suitable predetermined time after the equipment location information is stored in access circuit 110, sequencer 107 activates its output lead $\phi2$. The activation of lead $\phi2$ enables gate 112 to deliver the equipment location information in the flip-flops of access circuit 110 to time division network 105 and, at the same time, enables gate 113 to deliver the contents of FATS command register 114 to network 105. As described in U.S. Pat. No. 3,789,152 at Col. 21 line 5 and Col. 25 line 37 through Col. 26 line 33, network 105 includes a controller (not shown herein but shown in FIGS. 6 and 10 of U.S. Pat. No. 3,789,152) capable of accepting a port number and a FATS command to return to the processor the port number and time slot assigned thereto, if any, in the network. In accordance with my invention, the port number and time slot number returned by the network are applied to access circuit 115. Access circuit 115 utilizes the time slot number to enter time slot table 108-2 of scratch pad memory 108 at the location therein corresponding to the time slot number. For example, if time division network 105 is capable of assigning any of the 64 time slots to the network ports appearing therein, time slot table 108-2 will have 64 information storage locations. Each time slot information storage location in time slot table 108-2 has two bytes. The first byte has three fields, 1st, 2nd, 3rd, each with sufficient bit positions therein to record a port number returned to access circuit 115 by network 105 responsive to the FATS command. When access circuit 115 addresses a location it first reads the count byte and if the count is "0", it enters the count of "1" in the count byte and enters the port number in field 1st of the port number byte.

The next time that access circuit 115 is given the same time slot number by network 105, it will again read the count byte for that time slot number in table 108-2. This time it will read the count "1", increment the count to "2" and then enter the port number furnished it by network 105 in field 2nd of the port number byte for the time slot.

Following phase $\phi2$, sequencer 107 reactivates phase lead $\phi1$ causing access circuit 110 to address the next sequential item in port number list 108-1. A suitable predetermined time after the port equipment location information is entered into access circuit 110, sequencer 107 activates its output lead $\phi2$ causing that information together with the contents of the FATS command register 114 again to be delivered to network 105. Once again network 105 returns to access circuit 115 the time slot assigned to the port whose equipment location it has been furnished. Access circuit 115 receives the time slot and port information and enters the port number in the appropriate time slot information word of time slot table 108-2. If, on this accessing, a time slot information word is addressed for the second time, the incrementing of the count byte for this word will result in the count "2" being written in that byte.

Sequencer 107 continues energizing leads $\phi 1$ and $\phi 2$ sequentially until lead $\phi 1$ has been energized a number of times equal to the total number of line and port equipment location entries contained in scratch pad port number list 108-1. At this time, access circuit 115 will have been addressed to as many of the time slot information entries in time slot table 108-2 as are assigned in network 105. Thereafter sequencer 107 will energize lead $\phi 3$. The energization of lead $\phi 3$ activates sequential read access circuit 120 to sequentially address each of the 64 time slot information words in table 108-2. Each time a time slot information word is read from time slot table 108-2, the count byte thereof is read out and applied to the left-hand side of comparator 121. The right-hand side of comparator 121 is supplied with a count pattern representing the predetermined count of "2". If the contents of the count byte applied to comparator 121 is less than "2", comparator 121 energizes the upper input of AND gate 124. On the other hand, if the count byte applied to comparator 121 is equal to or greater than 2, comparator 121 energizes the lower input of gate 126. The energization of gate 124 will cause the contents of write IDLE register 123 to be applied to progress mark leads 130. While the energization of gate 126 will cause the contents of write LIMBO register 125 to be applied to progress marks leads 130. Write LIMBO register 125 and write IDLE register 123 each contain a distinctive predetermined pattern of bits. At the same time that sequential access circuit 120 delivers the contents of the count byte of a time slot information storage word from time slot table 108-2 to comparator 121 it delivers the contents of the port number byte to leads 131. Accordingly, a predetermined progress mark from either write LIMBO register 125 or write IDLE register 123 is available on leads 130 simultaneously with or very shortly after the appearance of the port number information on leads 131. The information on leads 130 and 131 is applied to main memory access circuit 103 which employs the information on leads 131 to access the appropriate progress mark registers in port records 102-1. The information on progress mark leads 130 is written into the selected progress mark registers. Thereafter when main memory 102 is accessed to obtain the contents of a progress mark register for a port assigned the time slot in network 105, it will receive either the LIMBO progress mark that had been stored in register 125 or the IDLE progress mark that had been stored in register 123. Responsive to the appearance of a LIMBO progress mark, the main processor will be addressed to another memory location which stores a program listing having a minimal number of instructions appropriate simply to the performance of call processing incident to taking down a connection. Further, when a progress mark is encountered having the IDLE code written therein, processor 101 may, in its usual manner, erase the time slot bit from the port circuit shift register (not shown) thereby clearing the network.

In accordance with the operation of the system just described, an arrangement has been provided for curtailing system processing following recovery from a memory failure condition. It should be apparent to those skilled in the art that only one form of illustrative system has been disclosed. Thus, it will be apparent that scratch pad memory 108 need not be a separate memory unit but may be configured out of predetermined memory cards remaining in main memory unit 102. In addition, it should be apparent that the parity failure detector circuit 101-1 and counter 101-2 may be configured within the main processor 101 by program control, and, likewise, the operation of sequencer 107 and the control of gates 112, 113, 124, and 125 may be provided under program control although it may be desirable when extreme reliability is required to provide "hard wired" connections, as indeed has been shown in the drawing. In addition, the FATS command register 114, the write LIMBO register 125 and the write IDLE register 123 may be either "wired-word" leads, i.e., parallel leads, predetermined ones of which are grounded, or, equally advantageously, may be contained within scratch pad memory 108 or main memory 102, depending upon the degree of reliability desired in a particular installation.

What has been described is considered only illustrative of the principles of this invention. Numerous other embodiments may be devised by those skilled in the art without departing from the spirit and scope thereof.

What is claimed is:

1. In a time division telephone switching system having a progress mark controlled main processor for controlling a switching network and in which the network is interrogatable to identify the time slot assigned therein to any port, the improvement for facilitating system recovery following a failure in the main processor memory unit, comprising means responsive to a signal indicative of the resumption of operation of said main processor memory unit for interrogating said network to identify the network ports to which each time slot in said network is assigned, means for accruing a count of the ports assigned for each time slot, and means operative after all of said time slots in said network have been identified for writing an idle progress mark in said main memory unit for each port having a time slot count of only one port accruing and for writing a special recovery progress mark in said main memory unit for each port having a time slot count of at least two ports accruing in said accruing means.

2. In a progress mark controlled telephone switching system having a main memory unit in which sequences of stored call processing instructions are identified by respective progress marks and in which each network port is allocated a main memory register word for recording an appropriate progress mark, the improvement for maintaining reliable system operation following recovery from a failure in the main memory unit, comprising means for interrogating the network to identify valid communications connections among ports appearing therein, and means for writing an IDLE progress mark in said main memory register word for each port not having a valid communications connection and for writing a special recovery progress mark in said memory unit register word for each port having a valid communications connection identified by said network.

3. The invention according to claim 2 in which said network is a time division switching network, and in which said means for writing said idle and said special progress marks includes means for accruing a count of the number of ports assigned an active connection during each time slot defined in said network.

4. In a time division telephone switching system having a main processor connected to a memory unit for receiving progress mark control information to control the establishment of communications connections among the ports in the network of said system, the combination comprising
means for sequentially accessing each of the ports appearing in said time division network,
storage means responsive to said sequentially accessing means for recording the time slot assigned each said port and for accruing a count of the number of ports assigned each said time slot, and
means for interrogating said storage means after all of said port circuits have been accessed to write an idle progress mark in said main memory unit for each port associated with less than a predetermined count in said storage means and to write a special progress mark in said main memory unit for each port associated with at least said predetermined count in said storage means.

5. In a time division telephone switching system according to claim 4 the combination further comprising means for detecting a failure in said memory unit and wherein said means for sequentially accessing is controlled by said detecting means.

6. In a memory unit controlled processing system in which the memory unit has a plurality of registers for storing progress marks each indicating the respective extent to which the processor of said system has progressed in handling the workload required for each of a corresponding plurality of port circuits in said system, each of said port circuits itself having a sufficient minimal amount of storage to maintain said port circuit in an established call connection, the improvement comprising
means operative subsequent to a failure in said memory unit for interrogating each of said port circuits to identify those thereof that are in fact in an established call connection, and
means responsive to said interrogating means having interrogated all of said port circuits for changing the corresponding progress marks in said memory unit registers to idle for port circuits found not to be in an established call connection and for writing a special progress mark in the one of said memory unit registers corresponding to each of said port circuits found to be in an established call connection.

7. In a memory unit controlled processing system in accordance with claim 6, the combination wherein said means operative subsequent to said failure in said memory unit comprises
means for detecting said failure,
means for detecting when said memory unit has been restored, and
means for initiating said interrogating of said port circuits only after said memory unit has been restored following said failure.

8. In a memory unit controlled processing system in accordance with claim 6, the combination in which said port circuits appear in a time division switching network and wherein said means for interrogating includes means for registering which of said port circuits is associated during a given time slot with at least one other of said port circuits of said network.

9. In a memory unit controlled processing system in accordance with claim 7, the combination wherein
said means for detecting said failure includes a parity detector connected to said main memory, a counter connected to said parity detector, said counter being scored each time information supplied to said detector from said man memory contains a parity failure, and flip-flop means connected to said counter and adapted to be set thereby when said count has reached a predetermined number of parity failures.

10. In a memory unit controlled processing system in accordance with claim 9 the combination wherein said means for detecting when said memory unit has been restored includes AND gate means having one input connected to said flip-flop and one input connected to said parity detector.

11. In a progress mark controlled telephone switching system having a main memory unit in which sequences of stored call processing instructions are identified by respective progress marks and a network for each port of which a main memory register word is allocated for pre-recording of an appropriate progress mark, the process for automatically maintaining reliable system operation following recovery from a failure in the main memory unit, comprising the steps of
interrogating the network to identify valid communications connections among ports appearing therein,
writing an idle progress mark in said main memory register word for each port not having a valid communications connection, and
writing a special recovery progress mark in said memory unit register word for each port having valid a communications connection identified in said network.

12. In a memory unit contrq led processing system in which the memory unit has a plurality of registers for storing progress marks indicating the extent to which the processor of said system has progressed in handling the workload required for each of a corresponding plurality of port circuits in said system, each of said port circuits itself having a sufficient minimal amount of storage to maintain said port circuit in an established call connection, the process comprising the steps of
counting a predetermined number of parity failures in the information supplied by said memory unit to said processor to detect memory unit malfunction, and
detecting the reappearance of correct parity information following the detecting of said malfunction to condition said system to commence the execution of the following steps:
sequentially accessing each of said port circuits to identify those thereof that are in fact in an established call connection, and
after all of said port circuits have been interrogated, changing the associated progress marks in said memory unit registers to idle for port circuits found not to be in an established call connection and,
writing a special progress mark in each of said memory unit registers corresponding to a port circuit found to be in an established call connection.

* * * * *